Dec. 9, 1958     J. MAURICE ET AL     2,863,326
ELECTROCENTRIFUGAL CLUTCHES
Filed May 17, 1955     7 Sheets-Sheet 7
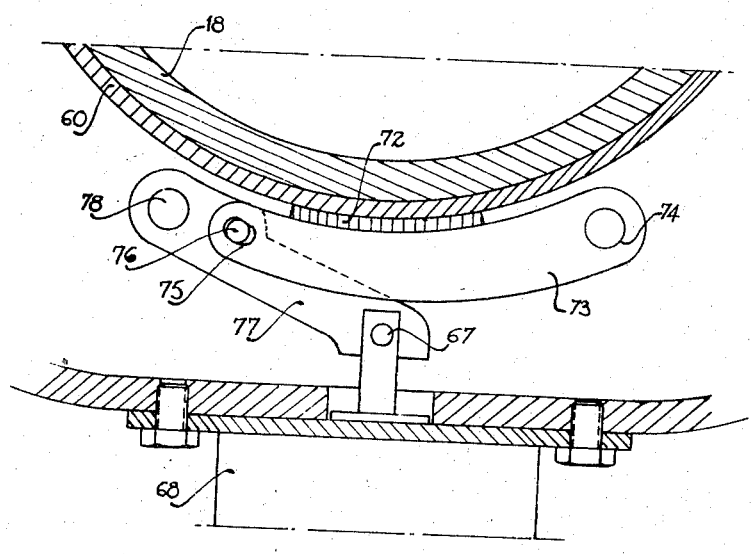
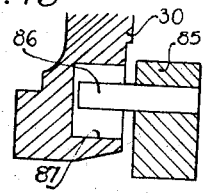
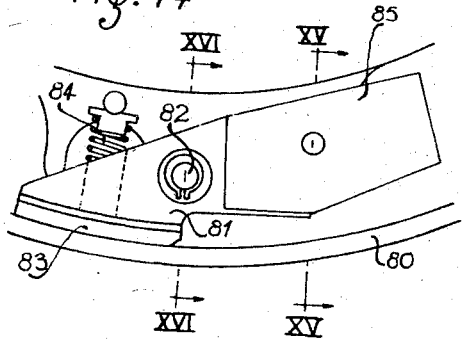
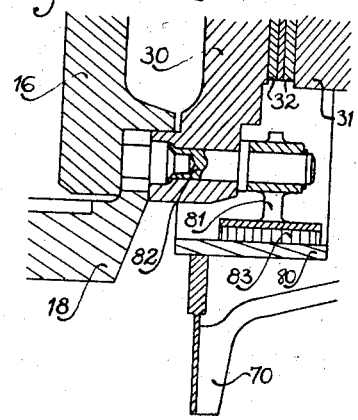

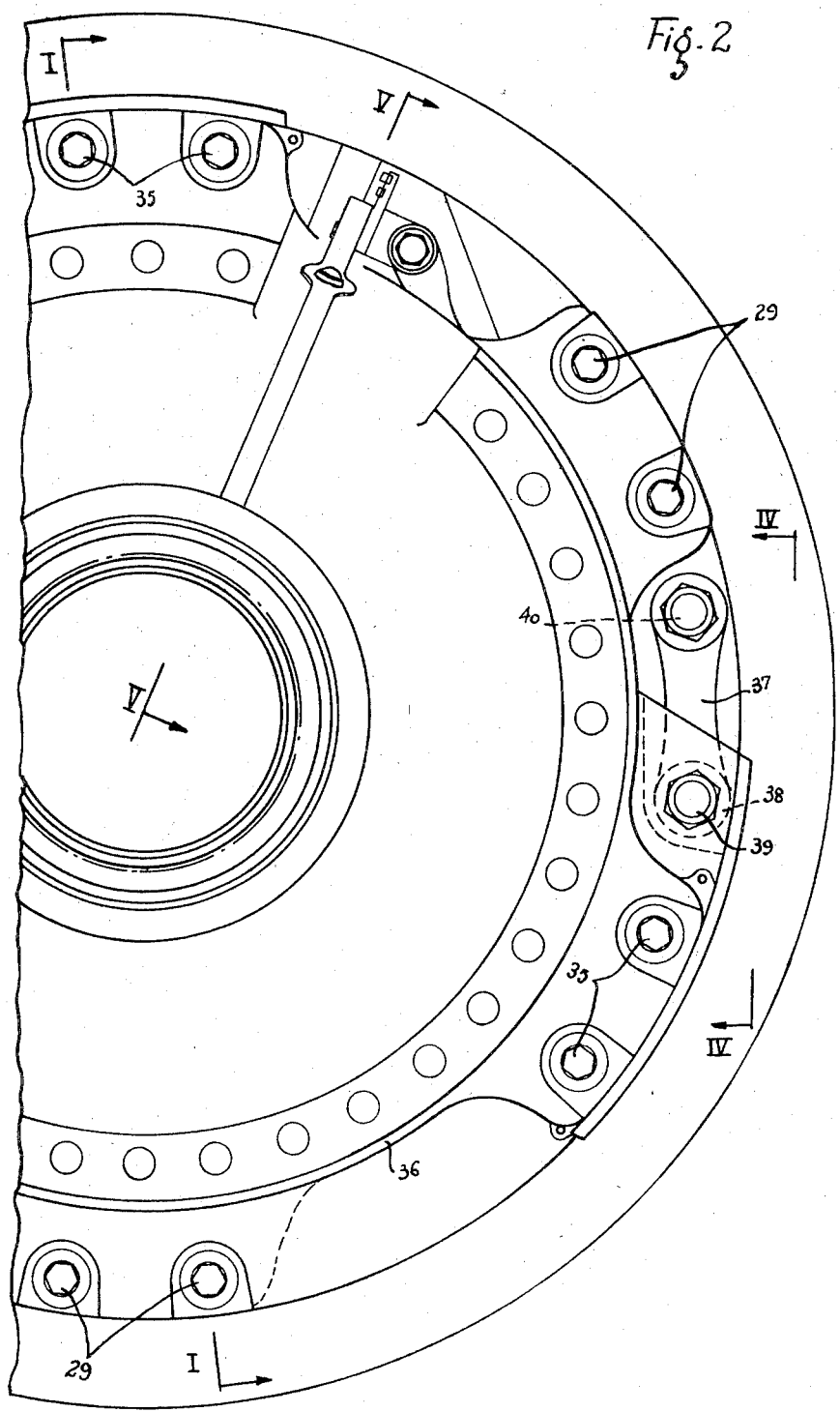

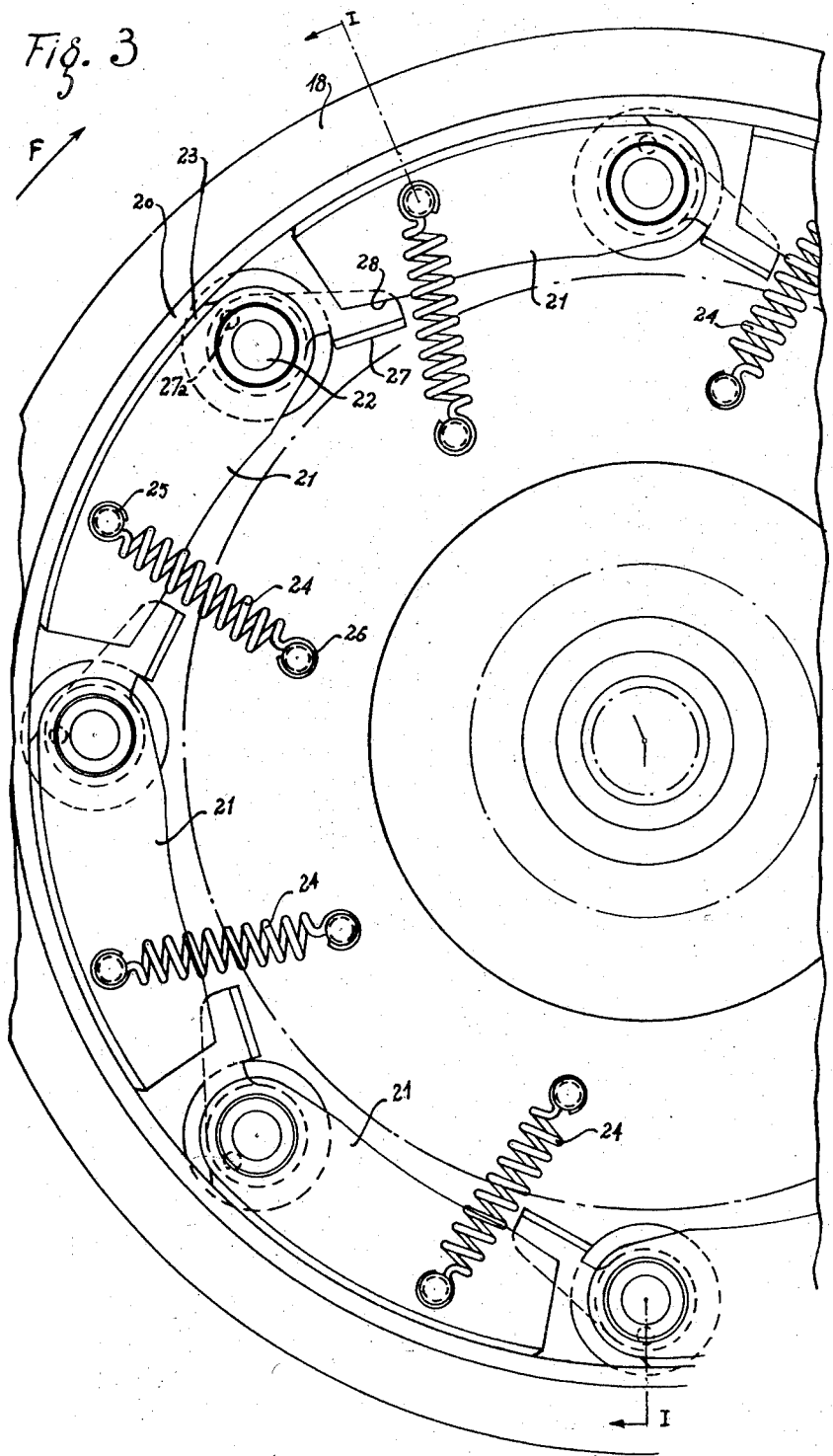

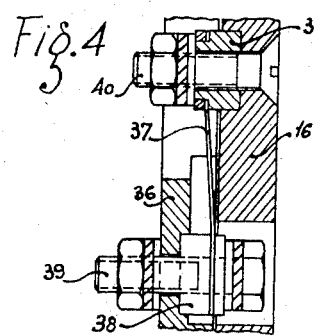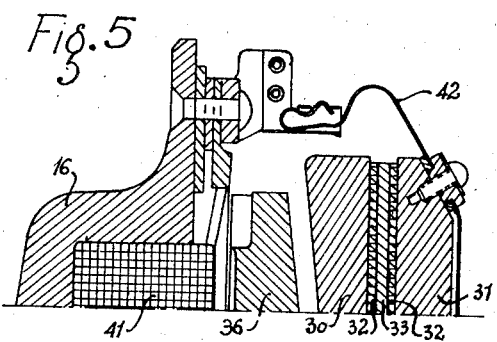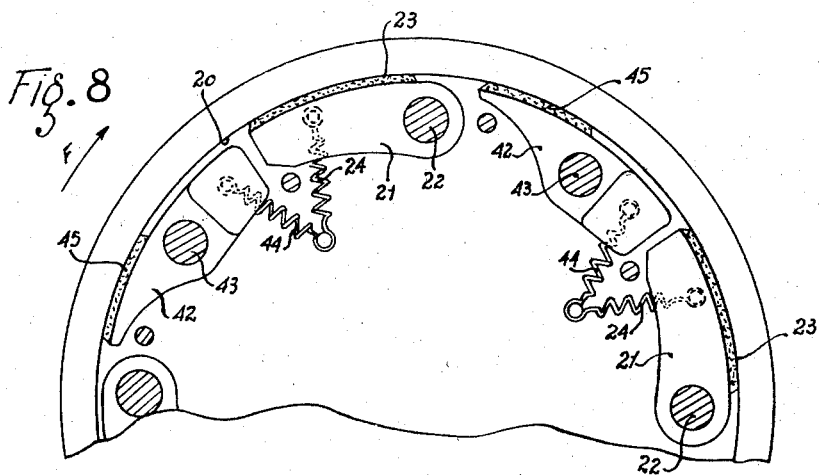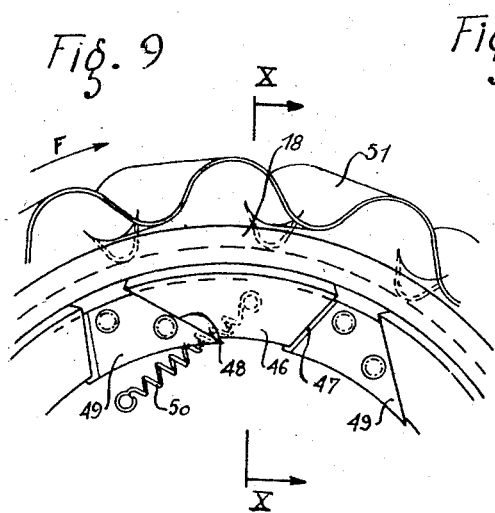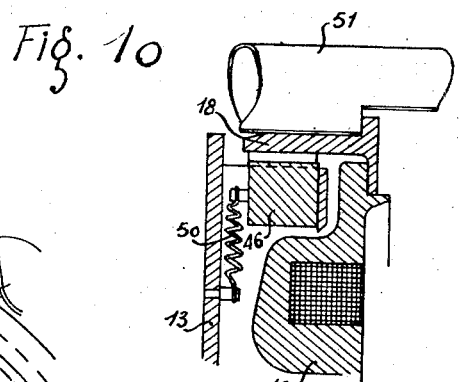

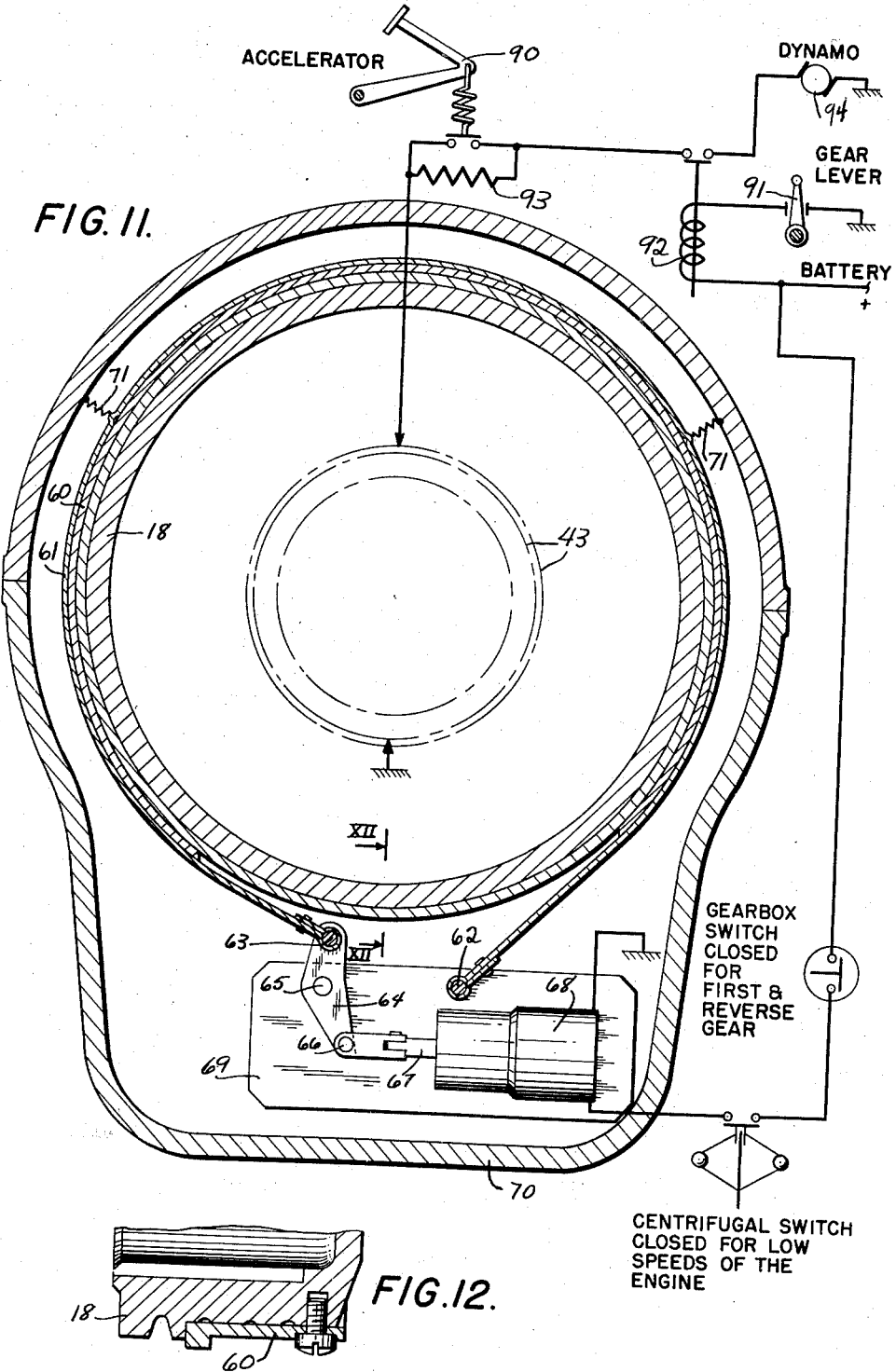

United States Patent Office 2,863,326
Patented Dec. 9, 1958

2,863,326

ELECTROCENTRIFUGAL CLUTCHES

Jean Maurice, Ablon, and Michel Rist, Paris, France, assignors to Societe Anonyme Francaise du Ferodo, Paris, France, a corporation of France Application May 17, 1955, Serial No. 509,038

Claims priority, application France May 20, 1954

12 Claims. (Cl. 74—472)

The present invention relates to clutches, especially those for automobile vehicles, of the kind in which there are arranged, between the driving shaft and the driven shaft, on the one hand an electro-magnetic coupling consisting of an electro-magnet and its corresponding armature, and on the other hand a centrifugal device, the coupling and the centrifugal device being mounted in series by means of an intermediate rotating member.

In the known clutches of this type, the electro-magnetic coupling tends to act abruptly. These known clutches are ill-adapted, in their application to automobile vehicles, for the engagement of the gears and they also necessitate complicated arrangements in order to permit of starting up the engine by driving it from the vehicle wheels. In addition, the friction surfaces have a tendency to heat up.

The present invention has for its object an electro-centrifugal clutch which is free from the above drawbacks and which, with a simple and compact construction, offers an excellent progression during starting, easy engagement of gears, and the possibility of starting up the engine by driving it from the vehicle wheels.

In accordance with one of the special features of the invention, the weight-head carrier is rigidly fixed to the driving shaft, the weight-heads being driven in rotation by the said shaft so that certain parts of them may move away from or come closer to the axis of the clutch, and being arranged so as to control the torque transmitted between the driving shaft and the intermediate rotating member by the action of the engine speed alone, whilst the electro-magnetic coupling is arranged to control suitably in time the torque which can be transmitted between the said intermediate member and the driven shaft, and is controlled in dependence on an electric control circuit which is made inoperative or operative, depending on whether the gear lever is actuated or not.

By virtue of this arrangement, it is possible to obtain not only an easy engagement of the gears due to the braking of the circuit of the electro-magnet, but also a good progression during starting.

In accordance with a further special feature, the weight-head and the electro-magnet act respectively on two separate sets of pairs of friction surfaces, each of which includes at least one friction lining of the type known by the name "Ferodo" or the like, one of the sets actuated by the weight-heads being located between the driving shaft and the intermediate member, whilst the other set which is operated by the electro-magnetic coupling is located between the intermediate member and the driven shaft. By means of this arrangement, during the engagement phases of the clutch, the action of the electro-magnetic coupling is not brutal but can be made relatively smooth, which enables pick-up of speed after engagement of gears to be effected without shock.

In one preferred form of construction, the friction surfaces associated with the electro-magnetic coupling are at right angles to the axis of the clutch and are spaced apart towards the exterior of the air-gap, whilst the friction surfaces co-operating with the centrifugal device are cylindrical about the axis of the clutch and are arranged at the periphery of the latter. The heat generated by the friction surfaces is thus easily dissipated. Ventilation or cooling means may be conveniently provided also for these surfaces. This enables the dimensions of the friction surfaces and, in consequence, the dimensions of the clutch to be reduced.

In accordance with a further remarkable feature of the invention, the torque which can be transmitted by the centrifugal device in the normal direction of application of this torque, is chosen so as to be less than the torque which can be transmitted by the electro-magnetic device until the speed of the motor at full throttle reaches the number of revolutions which correspond to the maximum engine torque and as a minimum 60% and preferably 75% of this number of revolutions. By this means, the centrifugal device acts alone with all the desired progression at the times of starting, and filters-out the engine vibrations at low speeds. This enables the electro-magnetic coupling to be brought into action only for the purposes of full de-clutching and the engagement of the gears. The construction of this coupling can, for this reason, be made very simple and of small volume, together with a good efficiency.

The electro-magnetic coupling should preferably be given a high time-constant. The coil and the circuit are such, for example, that the duration of establishment of an energising current, the intensity of which is 90% of the maximum intensity is proportionately greater as the maximum engine torque selected is greater, the said duration being preferably greater than 0.2 second for an engine having a maximum torque equal to 3 metre-kilogrammes, and greater than 0.6 second for an engine the maximum torque of which is equal to 15 metre-kilogrammes. It will be noted that a time-constant of this order is unusual in the case of the known electro-centrifugal clutches. The result of this time-constant is that, in combination with all or part of the arrangements in accordance with the invention, as indicated above, all shocks are suppressed during the engagement of gears.

In addition, means are also preferably provided to eliminate the effects of the inertia of the intermediate member when the engine speed falls to the idling speed and the first gear or the reverse gear is engaged. In accordance with these means, a braking device is applied to the intermediate member and is controlled so as to be rendered inactive during normal running and to be made active when the engine speed falls to the idling speed or when the intermediate member has an appropriate speed.

In accordance with a further special feature, the electro-magnetic coupling is designed to carry out the function of a torque limiting device and to limit the maximum transmissible torque to values which do not constitute any danger for the transmission, for example values comprised between 1.2 to 2 times the maximum engine torque. If it is in fact necessary to be able to take advantage of the additional torque which can be derived from the inertia of the engine when running, it is none the less necessary to protect the transmission from excessive stresses.

The clutch and the control circuits in accordance with the invention are so arranged that, with the accelerator in the position of rest, the torque which can be transmitted in the reverse direction is limited to a fraction of the maximum engine torque in the forward direction, comprised between 0.15 and 0.5, so as to be able to employ the braking torque of the engine without attaining a braking torque liable to result in skidding of the driving wheels under conditions in which the adhesion is reduced.

In accordance with a further feature which concerns more especially the centrifugal device, the transmissible torque provided by this device has the following particular features which may be considered separately or preferably in combination:

(1) This torque is approximately zero at a fast idling speed comprised between one tenth and one fifth of the maximum speed and becomes equal to the torque developed by the engine for a speed which corresponds to full throttle at an engine torque comprised between the maximum engine torque and two-thirds of this latter value.

(2) The torque transmitted by the centrifugal device in the reverse direction for a given speed is greater than the torque which can be transmited in the normal direction of application of the torque, the relation between the two torques attaining 150% with advantage.

(3) The torque when stationary preferably reaches a value which is sufficient to rotate the engine under the most unfavourable conditions of starting.

Thus the clutch can only be engaged when the engine develops a torque sufficient to avoid stalling. Rapid starting of the vehicle is obtained and the maximum use is made of the braking torque of the engine. In addition, the engine can be driven, when stationary, by the vehicle and, if the electro-magnetic coupling is excited, advantage can be taken when stationary of the supplementary braking effect due to the compression of the engine.

Other features and advantages of the invention will furthermore be brought out in the description which follows below of forms of construction chosen by way of example, with reference to the attached drawings in which:

Figs. 2 and 3 are partial views of the same clutch in transverse cross-section, and respectively following the line II—II and the line III—III of Fig. 1;

Fig. 4 is a partial view of the method of coupling of the yoke and of the armature, in cross-section following the line IV—IV of Fig. 2;

Fig. 5 is a partial view of the apparatus in cross-section taken along the line V—V of Fig. 2;

Fig. 8 is a view similar to that of Fig. 3 but to a smaller scale and shows an alternative form of a part of the appartus;

Figure 1:
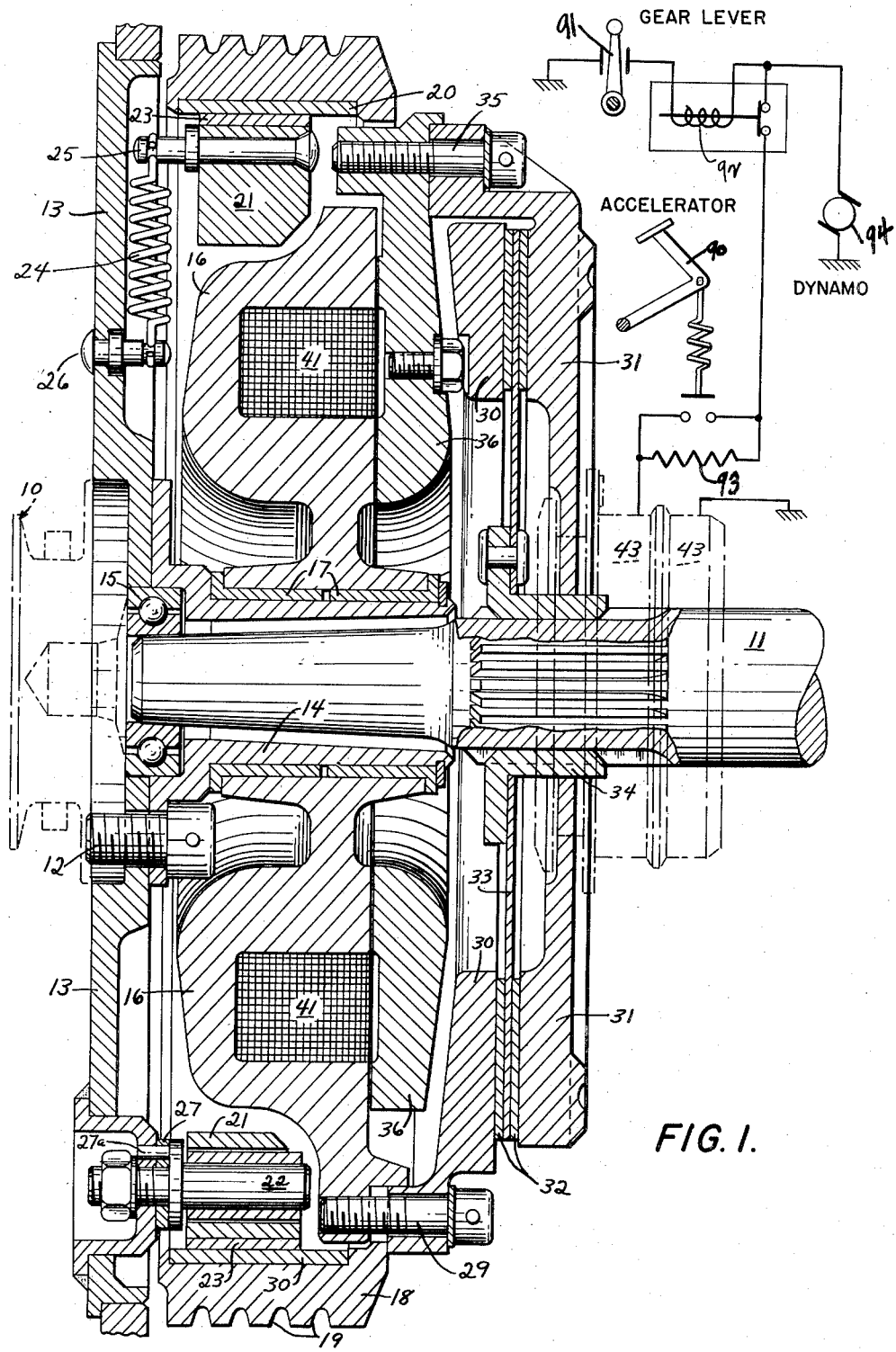
Fig. 1 is a view of a clutch in accordance with the invention in longitudinal cross-section following the line I—I of Figs. 2 and 3, the clutch being shown in the engaged position.

Fig. 9 relates to a further alternative form;

Fig. 10 is a view of the alternative form last-mentioned, in cross-section following the line X—X of Fig. 9;

Fig. 11 is a view in cross-section of a braking device for the intermediate member;

Fig. 12 is a view of a part of this device in cross-section following the line XII—XII of Fig. 11;

Fig. 13 is a partial view in cross-section of an alternative form of the braking device for the intermediate member;

Fig. 14 is a partial view in elevation of a further alternative form of the braking device for the intermediate member;

Figs. 15 and 16 are views of this further alternative form in cross-section respectively taken along the line XV—XV and the line XVI—XVI of Fig. 14.

In the form of construction shown in Figs. 1 to 5, which relates by way of example to an application of the invention to the transmission of an automobile vehicle, the device in accordance with the invention is arranged (see Fig. 1) between a driving shaft 10, constituted for example by the crank shaft of an engine, and a driven shaft 11 which forms the intake shaft of a gear-box.

On the driving shaft 10 are rigidly mounted by screws 12, on the one hand a fly-wheel 13, perpendicular to the axis of the device, and on the other hand a cylindrical socket 14 which extends in the vicinty of and around the driven shaft 11. A bearing 15 is provided between the shaft 11 and the assembly 13, 14. With this arrangement, all parasitic friction between the driven shaft 11 and the driving shaft 10 is eliminated.

A yoke 16 of an electro-magnet is rotatably mounted but axially in abutment against the socket 14 through the medium of self-lubricating journal bearings 17 and has rigidly fixed to its periphery a cylindrical drum 18 which extends close to the fly-wheel 13. By this means, the rotation of this yoke is not liable to drive the driven shaft 11 due to friction at the moment at which this shaft has a speed different from that of the yoke 16 when a gear is being engaged.

The external face of the drum 18 which forms an external casing for the clutch, is provided with cooling ribs 19, whilst the internal face of this drum is fitted with a friction track 20 of any suitable material. The drum 18 itself is preferably made of a light alloy. In the internal space enclosed by the drum 18, the yoke 16, and the fly-wheel 13, is housed a device the operation of which is governed by the speed of the shaft 10. In the present form of embodiment, this device is of the centrifugal type and comprises weight-heads 21 (see Figs. 1 and 3) which are symmetrically distributed along a circle and are preferably pivoted about spindles 22 which are rigidly fixed to the fly-wheel 13. Each weight-head 21 has an external face fitted with a friction lining 23 and incurved so as to follow the contour of the track 20 along a portion of this latter. The friction lining 23 may be of a material such as that known by the name of "Ferodo" or the like. It will be noted that the weight-heads are appreciably distant from the axis of the clutch and thus have great efficacity for a given dimension of the clutch. A restoring spring 24, acting under tension, is coupled between a pin 25 carried by the weight-head 21 and a pin 26 which is rigidly fixed to the fly-wheel 13. The spring 24 which is intended to eliminate the effects of play and noise, effects the disengagement of the weight-heads and has an effect on the law of variation of the torque transmitted as a function of the speed, as will be made clear later.

An abutment heel 27 centered on the pivotal shaft 22 of each weight-head 21 is fixed rigidly to the plate 13 by means of the nipple 27a so as to limit the travel of the next adjacent weight-head. On the yoke 16 are rigidly mounted by means of screws 29 the drum 18 referred to above and one of the plates 30 of a clutch unit, the other plate of which is shown at 31. The plates 30 and 31 are perpendicular to the axis of the clutch and are intended to grip the friction lining 32 of a disc 33 which is coupled to a hub 34. The friction linings 32 are preferably of material such as that known under the name "Ferodo" or the like. The disc 33 is arranged outside the electro-magnet and is slidably-mounted on the driven shaft 11 but is fast for rotation therewith. The plate 31 is fixed by means of screws 35 on the armature 36 associated with the yoke 16. The armature 36 is rigidly fixed for rotation but free to slide axially on the yoke 16, by means of small flexible tangential tongues 37. These tongues are pivoted at their extremities on magnetic rings 38 fixed by screws 39 to the armature and by screws 40 to the yoke. The thickness of the friction linings of the disc 33 is made such that the air-gap between the yoke 16 and the armature 36 is never reduced to zero.

It will be noted that the greater portion of the yoke-armature assembly is arranged inside the drum 18, so that the longitudinal overall dimension of the clutch is very small. This arrangement is made possible by virtue of the dimensions of the electro-magnetic clutch, which are smaller than those of an electro-magnetic clutch of the usual type. Since this clutch is not required to ensure the progression during starting, it is provided with friction linings which wear less quickly, and this enables the width of the air-gap to be reduced, thus reducing the size of the control electro-magnet.

The electric supply circuit of the coil 41 of the yoke 16 includes a flexible conducting blade such as 42 (see Fig. 5) and is provided with two collectors 43 (see Fig. 1) carried by the plate 31 and co-operating with brushes (not shown) for the supply and earth connections respectively.

In normal operation, the speed of the engine in the direction of the arrow F of Fig. 3 is sufficient to enable the action of the weight-heads 21 to couple rigidly together the drum 18 and the fly-wheel 13, whilst the electric current is such that the yoke 16, the armature 36 and the disc 33 are gripped together, so that the driven shaft 11 is rotated with the driving shaft 10.

Each time the gear lever 91 is actuated, a suitable switch 92 breaks the current supply to the coil 41 and in consequence the disc 33 is no longer gripped, which results in complete disengagement of the clutch. When the gear lever is released, the disc 33 is once more gripped. By virtue of the high time-constant of the circuit and by reason of the fact that the friction linings 32 are arranged to provide a slight degree of slip, smooth accelerations are obtained. An elastic friction coupling may also be envisaged with advantage.

The supply circuit for the coil may be very much simplified by the introduction of the centrifugal device, which ensures progressive starting of the vehicle. The circuit may be supplied from the battery or the dynamo 94 of the vehicle; it may include only a simple resistance 93 which is cut out of circuit at the beginning of the travel of the accelerator 90.

The electro-magnetic coupling is designed to carry out the functions of a torque-limiting device, and to limit the maximum torque which can be transmitted to values which do not constitute any danger to the transmission, for example values comprised between 1.2 to 2 times the maximum engine torque. If it is, in fact, necessary to be able to take advantage of the supplementary torque obtained from the inertia of the engine while running, it is none the less necessary to protect the transmission from excessive stresses. The electro-magnetic clutch and the control circuit in accordance with the invention, are so designed that, the accelerator being in the position of rest, the torque which can be transmitted in the reverse direction is limited to a fraction of the maximum engine torque in the forward direction, this fraction being comprised between 0.15 and 0.5, in order to take advantage of the braking torque of the engine without reaching a braking torque which would be liable to cause skidding of the driving wheels under conditions in which their surface-adhesion is reduced.

The progression of the increases in speed during the engagement of gears is ensured by the time required to establish the current in the controlling electro-magnet. This current will depend on the inductance of the circuit which includes the coil of the electro-magnet. This inductance may be made large without disadvantage in a circuit of this kind which has no sliding contacts, since the progression during starting is ensured by the centrifugal device. The value of inductance chosen will increase as the torque develoepd by the engine is larger. It is preferably given a value greater than 100 milihenry for a maximum engine torque of 3 metre-kilogrammes and greater than 600 millihenry if this torque attains 15 metre-kilogrammes.

The electric circuit of the coil 41 is preferably supplied from the dynamo. In this way, it is substantially open when the engine is idling and supplies a current which increases in intensity: as the engine speed increases, the torque which can be transmitted by the electro-magnetic coupling being greater than the torque transmissible by the weight-heads, until the speed of the engine at full throttle reaches the number of revolutions which correspond to the maximum engine torque, and at least 60% and preferably 75% of this number of revolutions. Thus, during starting, slip takes place at the weight-head 21 and this ensures a roughly parabolic variation of the torque as a function of the speed, which gives an excellent degree of comfort. In addition, this arrangement enables all shocks or jerks to be avoided when the accelerator is actuated abruptly.

It will be noted from Fig. 3 that the centre of gravity of each weight-head 21 and the centre of thrust of the friction surface carried by the weight-head are located to the rear of the shaft 22 in the direction of the arrow F. Thus, the centrifugal force tends to force the friction surface against the friction surface of the intermediate member. It is also easy to see that with this arrangement, there is a gripping effect when the engine is being driven by the vehicle. In other words, for the same radial force applied to the weight-head, the friction torque is greater in the reverse direction of rotation than in the forward direction. For the same speed, this enables a greater torque to be transmitted in the reverse direction than in the forward direction of application of the torque, and in consequence the braking torque due to the engine may be used with advantage over a wide range of speed.

In Fig. 3, elastic means 24 which are arranged to act in opposition to the centrifugal force, constitute means in accordance with the invention for varying the speed of the engine at which the weight-heads become engaged. The elastic means 24, which are constituted by tension springs or any other equivalent means such as compression springs acting on the other limb of the rocker arm, or an elastic ring interposed between the bore of the rocker arm and the pivot 22, working under torsion and initially stressed, are determined by the values of the radial component of the stress which they should apply in the position of rest $a$ and in the position in which the friction means are applied $b$ (see Figs. 6 and 7). The value $a$ determines the speed $n1$ at which the weight-heads leave their position of rest. At this speed, the centrifugal force generated by the weight-heads in their position of rest, and which varies in accordance with the curve A, counter-balances the elastic restraint $a$.

Figure 6:
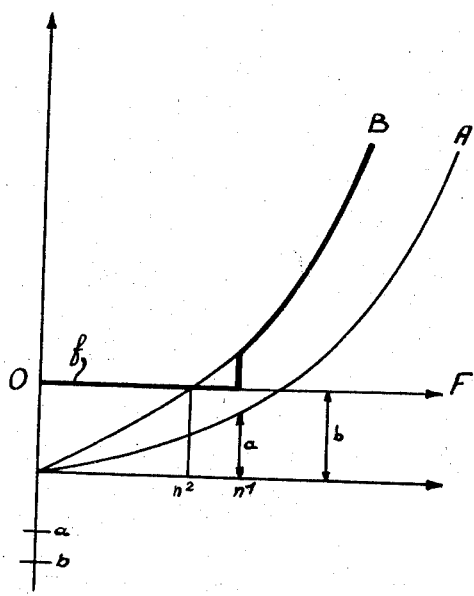
Figs. 6 and 7 are two diagrams showing respectively two different methods of variation of the torque transmissible by the apparatus as a function of the engine speed.
Figure 7:
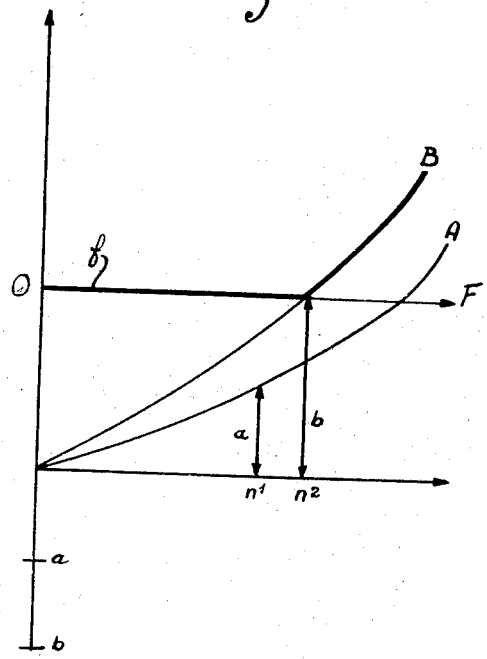

The centrifugal force developed by the weight-heads in their position of frictional contact varies as a function of the speed, as shown in the curve B. The value $b$ determines the value of that force which must be attained in order that a force $f$ may begin to be applied to the intermediate member by the frictional means of the weight-head. This value is reached at a speed $n2$. The value of this force is shown in Figs. 6 and 7 by the thick line which starts from the axis OF of the abscissae. If $n2$ is smaller than $n1$, the force $f$ is zero up to the speed $n1$, at which it jumps sharply and follows the curve B (see Fig. 6). If $n2$ is greater than $n1$, the force $f$ is zero up to the speed $n2$, and then follows the curve B (see Fig. 7). In this case, the weight-head begins to move at $n1$ and contact is made gently.

In accordance with the invention, the force $a$ is chosen in the case of Fig. 6 in such manner that $n1$ corresponds to the "fast idling speed" of the engine whilst the force $b$ is chosen in the case of Fig. 7 so that it is $n2$ which corresponds to this speed. It is known that by "fast idling speed" is generally implied a speed comprised between one tenth and one fifth of the maximum engine speed.

Elastic means may be provided between the weight-head and the friction-contact surfaces in order that the latter come into action after movement of the weight-head at the speed $n1$; there is thus obtained a progressive interaction of the contact surfaces.

The different weight-heads and the elastic means with which they form an assembly, may have different characteristics and this enables the curve to be obtained which is best suited to the starting characteristics which it is desired to obtain. It will be understood that the assemblies are preferably uniformly distributed around the axis of the clutch, identical assemblies being grouped symmetrically along a circle.

In an alternative form, the elastic means may be provided so as to add their effects to that of the centrifugal force. This constitutes an additional means of controlling the torques which can be transmitted in both directions of application of the torque. Means of this kind are preferably provided so that the torque transmissible in the reverse direction when stationary enables the engine to be started up by the vehicle. In the normal direction of application of the torque, there will then exist at the slowest idling speed a parasitic torque which, although it is very much less than the torque developed in the reverse direction, would be troublesome. There is then provided more especially in this case, a progressive supply of current from the dynamo to the electro-magnetic clutch which maintains the clutch in disengagement until the fast idling speed of the engine is reached.

In the alternative form of embodiment shown in Fig. 8, two different types of weight-heads are provided. The weight-heads of the first type, known as the main weight-heads, are similar to the weight-heads 21 shown in Fig. 3, and there is shown at 22 the pivotal shaft of each weight-head 21, the friction linings at 23 and the restoring spring at 24. The weight-heads 42 of the second type, known as the auxiliary weight-heads, are preferably mounted alternately with the weight-heads 21, and are arranged so as to move away from the track 20 under the effect of centrifugal force. The pivotal shaft 43 of each weight-head 42 is located between the centre of gravity of the weight-head and the centre of thrust of the friction means carried by the weight-head. This centre of thrust is located to the rear of the pivotal axis in the direction F. A spring 44 is coupled to the weight-head 42 and tends to apply the friction lining 45 of the latter against the track 20. With this arrangement, the weight-heads 42 enable the engine to be started up by driving it from the vehicle wheels, whilst the weight-heads 22 serve to transmit the torque when the engine has started. The friction surfaces with which the weight-heads 42 are provided, are applied by means of the springs 44 and the radial component produces a large frictional torque in the reverse direction by reason of the gripping action due to the arrangement of the centre of thrust with respect to the pivot 43. The weight-head is designed in order that, from the idling period or at the latest when the electro-magnetic clutch is engaged, the action of the centrifugal force cancels out the frictional effect of the weight-head 44 and renders the latter ineffective.

In a further alternative form of embodiment (see Figs. 9 and 10), the arrangement is again similar to those which have already been described, except that the weight-heads shown at 46 are not pivotally-mounted on the fly-wheel 13, but are retained with a certain clearance between two sloping faces 47 and 48 formed on blocks 49 which are rigidly fixed to the fly-wheel 13. Restoring springs 50 are applied to the weight-heads. With this arrangement, and by a suitable choice of the slope and the form of the faces 47 and 48, the couple which can be transmitted by the weight-heads in both directions can be modified at will. The sloping faces 47 and 48 give rise, in fact, to a radial component which is independent of the speed and depends solely on the magnitude and the direction of the coupling force between the weight-head and the driving shaft.

By giving a greater inclination, with respect to the mean radius, to the surfaces which co-operate in the reverse direction than to those which co-operate in the forward direction of rotation, the transmission of a greater torque in the reverse direction can readily be obtained for any given speed.

This arrangement can also be used in order to effect the driving of the engine from the wheels of the vehicle. In this case, the elastic means 50 are preferably chosen so as to apply the friction means fixed to the weight-head against the intermediate member with only a slight pressure. By reason of the slope of the face 48, a large radial force is produced and this permits of the engine being driven. As soon as the engine has started up, the sloping face 47 provides the driving medium. If its slope with respect to the radius is zero or negative, the elastic force 50 acts alone or it may even occur that this is counter-acted by a component of the driving force directed towards the axis.

It should be observed that forces of the same kind may be introduced in the case of the rocker-arm weight-heads of Fig. 3, for example when the shaft which is rigidly fixed to the fly-wheel 13 drives a weight-head having an elongated slot instead of a circular bore, the general direction of the elongated slot being inclined with respect to the radius.

A corrugated strip 51 having its corrugations inclined at an angle, may be applied around the drum 18 in order to produce a ventilation effect and thus result in effective cooling.

Reference will now be made to Figs. 11 and 12, in which is shown a braking device intended to obviate the effect of the inertia of the intermediate member 16, 18, 30, when, the vehicle being stationary, the engine speed is reduced to the idling speed and when the first gear is engaged. By means of this braking device, the kinetic energy of the member 16, 18, 30, which could transmit during engagement of the clutch, to the wheels of the vehicle a forward torque likely to produce jerks or shocks, is eliminated.

Around the drum 18 is mounted a circular track 60 (see Figs. 11 and 12) on which is wound a band-brake 61. One end of the band is coupled to a fixed point 62, whilst the other end is coupled to the point 63 of a cranked lever 64. The latter is pivotally-mounted on a fixed shaft 65 and is articulated at 66 on the plunger core 67 of an electro-magnet 68. The electro-magnet 68 and the pivots 62 and 65 are mounted on a support 69 which is fixed to the fixed clutch casing 70. Two springs 71 are arranged between this casing 70 and the brake 61 in order to hold the latter away from the friction-track 60 in the position of release. The electro-magnet 68 is supplied from the battery of the vehicle through a circuit which includes a centrifugal switch actuated in dependence on the engine speed so that the coil of the electro-magnet is excited only when this speed is very low.

During normal working, the electro-magnet 68 is thus not energised, and the band-brake 61 which is free, is held away from the friction-track 60 by means of the springs 71. There is thus no braking action between 60 and 61. At the moment of starting up in first gear or in reverse, when the engine is allowed to fall to the idling speed before engaging the gear, the electro-magnet is energised and the kinetic energy developed at 18 is absorbed by the braking action at 60 and 61. All jerks or shocks during the operation are thus obviated.

In a further alternative form (see Fig. 13), the braking device is similar to that which has just been described with reference to Figs. 11 and 12. There will again be seen at 18 the drum with the friction-track 60. With the track 60 co-operates a brake-shoe 72 carried by a lever 73 which is pivotally-mounted at 74 on the fixed casing. An elongated slot 75 is formed in the lever 73 and in this slot is engaged a stud 76 fixed to a second lever 77 pivotally-mounted at 78 on the fixed casing. The lever 77 is pivoted at 79 on the plunger core 67 of an electro-magnet 68 which is similar to that previously described and which is only energised at low engine speeds.

During normal running, the electro-magnet 68 is not energised. The brake-shoe 72 is separated from the track 60 and there is no braking action. At the moment of starting in first gear or in reverse gear, when the engine speed is allowed to fall to the idling speed, before the gear is engaged, the electro-magnet 68 is energised. The core 67 applies a thrust to the levers 73 and 77, and this thrust is applied with a mechanical advantage to force the brake-shoe 72 against the friction-track 60. Any shock which may result from the inertia of the drum 18 is thus eliminated.

Reference will now be made to Figs. 14 to 16, in which the arrangement is once again similar to those previously described. There will again be seen in Figs. 14 to 16, the drum at 18, the yoke at 16, at 30 and 31 the gripping plates and at 32 the friction linings. A circular track 80 is fixedly-mounted and centered on the fixed casing 70 of the clutch. With this track 80 is associated a brake-shoe 81 which is pivotally-mounted at 82 on the plate 30. One of the sides of the brake-shoe 81 is provided with a friction lining 83 applied against the track 80 by the action of a spring 84, whilst the other side of the brake-shoe 81 carries a counter-weight 85. With a view to limiting the movements of the counter-weight 85, a stud 86 is fixed to this counter-weight and is engaged in a slot 87 formed in the plate 30.

During normal running, when the engine speed is higher than the idling speed, the counter-weight 85 holds the brake-shoe 83 away from the track 80, due to the effect of centrifugal force acting in opposition to the action of the spring 84. There is no braking effect.

At the moment of starting up in first gear or in reverse gear, when the engine speed has been allowed to fall to the idling speed, the centrifugal force which is developed by the counter-weight 85 is insufficient to overcome the action of the spring 84. This spring forces the brake-shoe 83 against the friction-track 80, thus avoiding all shocks or jerks during starting.

What we claim is:

1. An electro-centrifugal clutch for motor vehicles having a shift-lever for changing gears, comprising a driving shaft, a driven shaft, an intermediate member, a centrifugal friction clutch for automatically coupling said driving shaft and said intermediate member in dependence upon the rotational speed of the driving shaft, an electromagnetic clutch for selectively coupling said intermediate member and said driven shaft, an electric circuit for controllably electrically energizing said electromagnetic clutch, a switch in said circuit sensitive to the shift-lever, said switch being adapted to be opened to de-clutch said electromagnetic clutch when said shift lever is actuated and being closed to engage said electromagnetic clutch when said shift lever is released, said electromagnetic clutch having a magnetic element rotatably mounted with respect to one of said shafts, said intermediate member being disposed concentrically with and rigidly secured to said magnetic element.

2. An electro-centrifugal clutch according to claim 1, in which said intermediate member comprises a drum disposed circumferentially surrounding and cooperating frictionally with said centrifugal clutch.

3. An electro-centrifugal clutch according to claim 2, in which said drum comprises a peripheral internal track and in which said centrifugal clutch comprises a plurality of speed-responsive clutch shoes frictionally engageable with said track, and means for operably connecting said shoes to said driving shaft.

4. An electro-centrifugal clutch according to claim 3, in which said connecting means comprises pivot means for pivotally mounting the brake shoes.

5. An electro-centrifugal clutch according to claim 2, in which said drum is provided with peripheral external cooling ribs.

6. An electro-centrifugal clutch according to claim 1, in which said magnetic element consists of a coil-supporting yoke element.

7. An electro-centrifugal clutch according to claim 1, further comprising a friction disc rigid in rotation with said driven shaft, a pair of tightening plates adapted to grasp said disc therebetween, a second magnetic element, means securing said tightening plates to said magnetic elements respectively and said plates being disposed axially spaced from said magnetic elements.

8. In a transmission system, a driving shaft, an intermediate member, a driven shaft, first coupling means for engaging and disengaging in rotation said driving shaft and said intermediate member in dependence upon the rotational speed of said driving shaft, second coupling means for engaging and disengaging in rotation at will said intermediate member and said driven shaft, the combination with said intermediate member comprising brake means for braking said member, and control means sensitive to the driving shaft rotational speed to engage said brake means when said speed corresponds substantially to a selected idling speed and to disengage said brake means when said rotational speed is substantially faster than said idling speed.

9. In a transmission system according to claim 8, in which said control means comprises an electromagnet, an energizing circuit for said electromagnet having a centrifugal switch sensitive to the driving shaft rotational speed.

10. In a transmission system according to claim 9, in which said circuit further comprises a switch closed for first gear and reverse gear ratios and open for other gear ratios said switch being connected in series with the electromagnet.

11. In a transmission system comprising in combination, a driving shaft, an intermediate member, a driven shaft, in combination, first coupling means for engaging and disengaging in rotation said driving shaft and said intermediate member in dependence upon the rotational speed of said driving shaft, second coupling means for engaging and disengaging in rotation at will said intermediate member and said driven shaft, the combination with said intermediate member including brake means for braking said member and control means for said brake, said control means comprising means sensitive to the rotational speed of the intermediate member to engage said brake means when said rotational speed is below a predetermined value and to disengage said brake means when said speed is above said value.

12. In a transmission system according to claim 11, in which said brake means comprise a stationary track, a pivotally mounted brake-shoe frictionally engageable with said track, and said control means comprises elastic means for engaging said shoe against said track, and centrifugal counterweights mounted on said shoe for disengaging said brake-shoe.

References Cited in the file of this patent

UNITED STATES PATENTS

| | | |
|---|---|---|
| 2,055,300 | Maurer | Sept. 22, 1936 |
| 2,101,946 | Jonsson | Dec. 19, 1937 |
| 2,375,782 | Gillfillan | May 15, 1945 |

FOREIGN PATENTS

| | | |
|---|---|---|
| 617,406 | Great Britain | Feb. 4, 1949 |
| 965,620 | France | Sept. 18, 1950 |
| 285,971 | Switzerland | Feb. 2, 1953 |
| 1,098,115 | France | July 18, 1955 |